(12) United States Patent
Poulsen et al.

(10) Patent No.: US 9,807,487 B2
(45) Date of Patent: Oct. 31, 2017

(54) MICROPHONE WITH A ROTATING CONNECTOR

(71) Applicant: DPA Microphones A/S, Allerød (DK)

(72) Inventors: Christian Poulsen, Frederiksberg (DK); Anders Poulsen, Holte (DK)

(73) Assignee: DPA Microphones A/S, Allerød (DK)

( * ) Notice: Subject to any disclaimer, the term of this patent is extended or adjusted under 35 U.S.C. 154(b) by 0 days.

(21) Appl. No.: 15/100,922

(22) PCT Filed: Dec. 2, 2014

(86) PCT No.: PCT/EP2014/076240
§ 371 (c)(1),
(2) Date: Jun. 1, 2016

(87) PCT Pub. No.: WO2015/082464
PCT Pub. Date: Jun. 11, 2015

(65) Prior Publication Data
US 2016/0309248 A1    Oct. 20, 2016

(30) Foreign Application Priority Data

Dec. 2, 2013 (EP) ...................................... 13195370

(51) Int. Cl.
*H04R 9/08* (2006.01)
*H04R 1/04* (2006.01)
(Continued)

(52) U.S. Cl.
CPC .............. *H04R 1/04* (2013.01); *F16M 11/06* (2013.01); *F16M 13/022* (2013.01);
(Continued)

(58) Field of Classification Search
CPC ............................. H04R 1/08; H04R 2410/03
(Continued)

(56) References Cited

U.S. PATENT DOCUMENTS 5,154,381 A   10/1992   Malinao
5,454,042 A    9/1995   Drever
(Continued)

FOREIGN PATENT DOCUMENTS

AT         303145      11/1972
CN      201995107 U     9/2011
(Continued)

OTHER PUBLICATIONS

Extended European Search Report for EP 13 19 5370 dated Apr. 29, 2014.
(Continued)

*Primary Examiner* — Sunita Joshi
(74) *Attorney, Agent, or Firm* — Knobbe Martens Olson & Bear LLP (57) ABSTRACT

A microphone assembly comprising: a microphone for converting an acoustic signal to an electrical microphone signal; a tube enclosing at least a part of a first conductor for conducting the microphone signal, the tube comprising a rigid first tube part and a rigid second tube part. The first tube part has a first primary tube end and a first secondary tube end, wherein the microphone is attached at the first primary tube end. The second tube part has a second primary tube end and a second secondary tube end. A first rotating connector between the first tube part and the second tube part allows rotating the first tube part in relation to the second tube part about a first rotation axis.

15 Claims, 5 Drawing Sheets (51) Int. Cl.
*F16M 11/06* (2006.01)
*H04R 1/08* (2006.01)
*F16M 13/02* (2006.01)
*F16M 13/04* (2006.01)

(52) U.S. Cl.
CPC ............... *F16M 13/04* (2013.01); *H04R 1/08* (2013.01); *H04R 2201/025* (2013.01)

(58) Field of Classification Search
USPC .................................................. 381/363, 364
See application file for complete search history.

(56) References Cited

U.S. PATENT DOCUMENTS

| | | | |
|---|---|---|---|
| 6,934,461 B1 | 8/2005 | Strub et al. | |
| 2005/0254679 A1 | 11/2005 | Akino | |
| 2006/0182301 A1 | 8/2006 | Medveczky | |
| 2006/0285713 A1 | 12/2006 | Lin | |
| 2008/0253599 A1 | 10/2008 | Banks | |
| 2008/0279408 A1 | 11/2008 | Matsui | |
| 2010/0083470 A1* | 4/2010 | Murata | H04R 1/08 24/3.12 |

FOREIGN PATENT DOCUMENTS

| | | |
|---|---|---|
| DE | 2052442 | 12/1971 |
| DE | 41 26 724 A1 | 2/1993 |
| DE | 10 2008 005 107 A1 | 7/2009 |
| DE | 10 2008 005 109 A1 | 7/2009 |
| JP | 2001-268678 A | 9/2001 |
| JP | 2004-254262 A | 9/2004 |
| WO | WO 96/31994 A1 | 10/1996 |

OTHER PUBLICATIONS

International Search Report for PCT/EP2014/076240 dated Feb. 3, 2015.

* cited by examiner

MICROPHONE WITH A ROTATING CONNECTOR

CROSS REFERENCE TO RELATED APPLICATIONS

This application is a U.S. National Phase Application of PCT International Application Number PCT/EP2014/076240, filed on Dec. 2, 2014, designating the United States of America and published in the English language, which is an International Application of and claims the benefit of priority to European Patent Application No. 13195370.5, filed on Dec. 2, 2013. The disclosures of the above-referenced applications are hereby expressly incorporated by reference in their entireties.

The present invention relates to a microphone, such as a lavalier microphone, or clip microphone, in particular to a lavalier microphone comprising a rotating connector for allowing easy and convenient attachment of the microphone.

BACKGROUND

Actors, TV hosts, performers or users alike, want their voice to be recorded or amplified in high sound quality while seeking a microphone which is as invisible as possible to not take away the focus of the viewer.

In order to attain and maintain a high quality sound recording, the microphone needs to maintain a very precise location in respect to the mouth of the user, and preferably the microphone should be a directional microphone directed towards the mouth of the user.

A lavalier microphone is a small microphone that is mounted to the user, e.g. to a shirt, in order to allow hands-free operation. A lavalier microphone is most commonly provided with a small clip for attaching the microphone to collars, ties, or other clothing. The cord may be hidden by clothes and run to an auxiliary device such as a radio frequency transmitter kept in a pocket or clipped to a belt, or routed directly to a mixer or a recording device.

However, several problems arise in known assemblies of lavalier microphones. First of all, the clip may be bulky, lack precise attachment, or may damage the clothes to which it attaches. Secondly, at least part of the conducting cable extending from the microphone is not properly hidden. Further, the microphone, cable and clip assembly may be subject to noise e.g. from the cable scratching against the clothes near the microphone, or the clothes scratching directly on the microphone.

Additionally, the microphone assembly should provide for use of a directional microphone sensitive to sounds from substantially only one direction, thereby reducing undesired capture of sounds from unintentional sources. Traditional microphone assemblies of the lavalier kind are limited to a fixed position of the microphone.

Applications have been proposed wherein a microphone cable is concealed within a clamp, such as the clip-on microphone of DE 10 2008 005 109 A1 having a microphone cable running within an arm of a holding clip and/or a clamp on a rear side and behind a piece of clothing of a person. However, the clip-on microphone disclosed in DE 10 2008 005 109 performs poorly if a directional microphone is preferred.

SUMMARY

Accordingly, the is a need for a lavalier microphone or microphone assembly, which, in a simple and effective way provides easy and simple attachment of the microphone, while hiding cables and other bulky parts, at the same time attaining a possibility of pointing the microphone into a desired direction.

Despite the known solutions there is still a need for a lavalier microphone which in a simple and effective way, hides cables and other bulky parts, while attaining a possibility of directing a directional microphone towards the mouth of the user to provide high quality sound and reducing possible causes of noise.

Accordingly, a microphone assembly is provided, wherein the microphone assembly comprises a microphone for converting an acoustic signal to an electrical microphone signal; a tube enclosing at least a part of a first conductor for conducting the microphone signal, the tube comprising a rigid first tube part and a rigid second tube part. The first tube part has a first primary tube end and a first secondary tube end, and the microphone may be attached at the first primary tube end. The second tube part has a second primary tube end and a second secondary tube end. The microphone assembly comprises a first rotating connector between the first tube part and the second tube part for rotating the first tube part in relation to the second tube part about a first rotation axis.

Also disclosed is a microphone assembly comprising a microphone for converting an acoustic signal to an electrical microphone signal; a tube enclosing at least a part of a first conductor for conducting the microphone signal, the tube comprising a rigid first tube part, and a rigid second tube part; and a clamp member mounted on the tube for affixing the microphone assembly to a piece of clothing. The first tube part has a first primary tube end and a first secondary tube end, and the microphone may be attached at the first primary tube end. The second tube part has a second primary tube end and a second secondary tube end. The microphone assembly comprises a first rotating connector between the first tube part and the second tube part for rotating the first tube part in relation to the second tube part about a first rotation axis, wherein the first rotation axis is a longitudinal center axis of the first tube part at the first secondary tube end.

It is an advantage of the microphone assembly that easy, convenient and precise attachment of the microphone assembly is provided leading to high quality sound recording with reduced noise.

It is an advantage of the present disclosure that means are provided for directing the microphone in a desired direction, e.g. towards the mouth of a user wearing the microphone assembly, irrespective of the attachment means. Hence, the present invention provides improved possibilities of utilizing a directional microphone rather than an omni-directional microphone. However, even if utilizing an omni-directional microphone, the present invention advantageously enables initial attachment of the microphone assembly and subsequently adjusting the position of the microphone towards a preferred sound source, e.g. the mouth of the user.

Further, the present invention facilitates optimum use of the microphone assembly in different user setups. The microphone assembly may e.g. be affixed to a woman's or a man's buttoned shirt where the overlap are respectively reversed, and in both cases the microphone may be directed towards the mouth of the user.

It is a further advantage of the present invention that means are provided for directing a connecting cable in a desired direction to reduce undesired pull forces.

Thus, the present invention provides for easy and convenient positioning of the microphone assembly, such that, the microphone assembly may be fast and easily attached and adjusted to fit e.g. a guest in a TV-studio, in a manner reducing potential sources of noise.

BRIEF DESCRIPTION OF THE DRAWINGS

The above and other features and advantages of the present invention will become readily apparent to those skilled in the art by the following detailed description of exemplary embodiments thereof with reference to the attached drawings, in which:

FIG. 5 a, b and c schematically illustrates an exemplary microphone assembly with rotating connectors in different angular positions, FIG. 6 schematically illustrates an exemplary microphone assembly with a clamp member, FIG. 7 schematically illustrates a cross section of an exemplary microphone assembly, and FIG. 8 schematically illustrates an exemplary microphone assembly.

DETAILED DESCRIPTION

The figures are schematic and simplified for clarity, and they merely show details which are essential to the understanding of the invention, while other details have been left out. Throughout, the same reference numerals are used for identical or corresponding parts. It is to be noted that the wording "first" and "second" are used for separating elements of similar function. Thus, a "second" element does not necessarily require the presence of a "first" element.

The microphone assembly comprises a tube. The tube may comprise a plurality of tube parts, including the first tube part and the second tube part. The tube has a first tube end and a second tube end. The first primary tube end may constitute the first tube end. The first tube end may thus be connected to the microphone. The tube or parts thereof may be made of a electrically conductive material, such as a metal, an alloy comprising one or more metals or a conductive composite material. The tube may form a channel accommodating at least a part of the first conductor or one or more first conductor parts. An insulator may insulate the first conductor from the tube.

The tube may have a length larger than 1 cm and/or less than 10 cm. The length of the tube may be between 1 cm and 8 cm, such as between 2 cm and 6 cm, such as between 3 cm and 5 cm. Generally, the microphone assembly or at least the visible parts should be as small as possible in order to be as invisible as possible. On the other hand, the microphone assembly should be large enough to be easy to handle and allowing proper attachment to the piece of clothing.

The microphone may be a directional or an omni-directional microphone. The microphone may be orientated on the microphone assembly having a direction towards the mouth of the user, especially if a directional microphone is used.

The microphone assembly may comprise a second conductor or second conductor parts connected to the microphone, e.g. for providing a ground electrode. The tube may be a conductive tube forming at least a part of the second conductor. In exemplary microphone assemblies, the tube encloses at least a part of the second conductor. The second conductor may be a conductor separate from the tube.

The second tube end may be attached to a cable, and thus the cable may enclose a part of the first conductor. In exemplary microphone assemblies, the tube may comprise a connector with first and second terminals attached to the second tube end for connecting the microphone assembly to an electrical cable or external device comprising a corresponding connector. The first terminal may be connected to the first conductor. The second terminal may be connected to the second conductor (tube or conductor separate from the tube).

The first tube part may comprise a first primary bend. The first tube part may comprise a first secondary bend.

The first primary bend and/or the first secondary bend may each or in combination bend the first tube part in an angle in the range from 30 degrees to 270 degrees.

The first primary bend and/or the first secondary bend may each or in combination bend the first tube part in an angle in the range from 45 degrees to 135 degrees, e.g. from 80 degrees to 100 degrees. The first primary bend and/or the first secondary bend may be arc-shaped.

The first primary bend and/or the first secondary bend may each or in combination bend the first tube part in an angle in the range from 135 degrees to 225 degrees, e.g. from 170 degrees to 200 degrees. The first primary bend and/or the first secondary bend may be arc-shaped.

The first primary bend and/or the first secondary bend may be a 90 degrees bend forming an L-shaped bend, or a 180 degrees bend forming a U-shaped bend.

The first primary bend and/or the first secondary bend may have a radius of curvature less than 10 mm, e.g. in the range from 2 mm to 6 mm, such as 4 mm, or in the range from 1 to 5 mm, e.g. 2 mm. The first primary bend and/or the first secondary bend may change the direction of a central longitudinal axis of the first tube part by more than 30 degrees, such as between 80 and 100 degrees, such as 90 degrees. The first primary bend and/or the first secondary bend may change the direction of a central longitudinal axis of the first tube part by more than 140 degrees, such as between 160 and 200 degrees, such as 180 degrees.

The second tube part may comprise a second primary bend. The second tube part may comprise a second secondary bend.

The second primary bend and/or the second secondary bend may each or in combination bend the second tube part in an angle in the range from 30 degrees to 270 degrees.

The second primary bend and/or the second secondary bend may each or in combination bend the second tube part in an angle in the range from 45 degrees to 135 degrees, e.g. from 80 degrees to 100 degrees. The second primary bend and/or the second secondary bend may be arc-shaped.

The second primary bend and/or the second secondary bend may each or in combination bend the second tube part in an angle in the range from 135 degrees to 225 degrees, e.g. from 170 degrees to 200 degrees. The second primary bend and/or the second secondary bend may be arc-shaped.

The second primary bend and/or the second secondary bend may be a 90 degrees bend forming an L-shaped bend, or a 180 degrees bend forming a U-shaped bend.

The second primary bend and/or the second secondary bend may have a radius of curvature less than 10 mm, e.g. in the range from 2 mm to 6 mm, such as 4 mm, or in the range from 1 to 5 mm, e.g. 2 mm. The second primary bend and/or the second secondary bend may change the direction of a central longitudinal axis of the second tube part by more than 30 degrees, such as between 80 and 100 degrees, such as 90 degrees. The second primary bend and/or the second secondary bend may change the direction of a central longitudinal axis of the second tube part by more than 140 degrees, such as between 160 and 200 degrees, such as 180 degrees.

One or more bends, such as the first primary bend and/or the first secondary bend and/or the second primary bend may direct the microphone in a desired direction such as away from clothing to where the microphone assembly is to be attached, thus reducing noise from various sources and/or towards a sound source.

One or more bends, such as the first primary bend and/or the first secondary bend and/or the second primary bend and/or the second secondary bend may direct conducting parts of the microphone assembly around an edge of a piece of clothing, such as to hide a cable, a cable connector and other bulky parts behind the piece of clothing. For example, the microphone assembly may be attached to the front opening of a buttoned shirt, the first primary bend and/or the first secondary bend and/or the second primary bend and/or the second secondary bend will guide the conducting parts to the rear side of the clothing, i.e. the side of the clothing opposite the side presenting the microphone.

The first rotating connecter connects the first tube part and the second tube part, and enables rotation of the first tube part in relation to the second tube part about a first rotation axis. The first rotating connector may have a first coupling state and a second coupling state, wherein the first tube part in the second coupling state is rotated at least 45 degrees in relation to the second tube part compared to the first tube part in the first coupling state. Rotation of the tube parts may be performed while the tube parts are separated. The first rotating connector may connect the first secondary tube end with the second primary tube end. The first rotation axis may be a longitudinal center axis of the first tube part at the first secondary tube end, and/or the first rotation axis may be a longitudinal center axis of the second tube part at the second primary tube end.

The first rotating connector may be releasable for separating the first tube part and the second tube part, e.g. during rotation. The first conductor may comprise a first primary conductor part, e.g. enclosed by the first tube part, and a first secondary conductor part, e.g. enclosed by the second tube part. The first primary conductor part and the first secondary conductor part may be seperateable at the first rotating connector.

The microphone assembly may comprise a rigid third tube part with a third primary tube end and a third secondary tube end.

The third tube part may comprise a third primary bend. The third tube part may comprise a third secondary bend.

The third primary bend and/or the third secondary bend may each or in combination bend the third tube part in an angle in the range from 30 degrees to 270 degrees.

The third primary bend and/or the third secondary bend may each or in combination bend the third tube part in an angle in the range from 45 degrees to 135 degrees, e.g. from 80 degrees to 100 degrees. The third primary bend and/or the third secondary bend may be arc-shaped.

The third primary bend and/or the third secondary bend may each or in combination bend the third tube part in an angle in the range from 135 degrees to 225 degrees, e.g. from 170 degrees to 200 degrees. The third primary bend and/or the third secondary bend may be arc-shaped.

The third primary bend and/or the third secondary bend may be a 90 degrees bend forming an L-shaped bend, or a 180 degrees bend forming a U-shaped bend.

The third primary bend and/or the third secondary bend may have a radius of curvature less than 10 mm, e.g. in the range from 2 mm to 6 mm, such as 4 mm, or in the range from 1 to 5 mm, e.g. 2 mm. The third primary bend and/or the third secondary bend may change the direction of a central longitudinal axis of the third tube part by more than 30 degrees, such as between 80 and 100 degrees, such as 90 degrees. The third primary bend and/or the third secondary bend may change the direction of a central longitudinal axis of the third tube part by more than 140 degrees, such as between 160 and 200 degrees, such as 180 degrees.

The microphone assembly may comprise a second rotating connector between the second tube part and the third tube part for rotating the second tube part in relation to the third tube part about a second rotation axis. The second rotating connector may connect the second secondary tube end with the third primary tube end. The second rotation axis may be a longitudinal center axis of the second tube part at the second secondary tube end, and/or the second rotation axis may be a longitudinal center axis of the third tube part at the third primary tube end.

The second rotating connector may be releasable for separating the second tube part and the third tube part. The first conductor may comprise a first tertiary conductor part.

The first secondary conductor part and the first tertiary conductor part may be seperateable at the second rotating connector.

The microphone assembly may comprise a second conductor. The second conductor may be connected to the microphone, such as providing a ground electrode. The tube may be a metal tube forming at least a part of the second conductor. Alternatively the tube may enclose at least a part of the second conductor. The second conductor may comprise a second primary conductor part and a second secondary conductor part. The second primary conductor part and the second secondary conductor part may be seperateable at the first rotating connector. The second conductor may comprise a second tertiary conductor part. The second secondary conductor part and the second tertiary conductor part may be seperateable at the second rotating connector.

The microphone assembly may comprise an electrical cable. The cable may be attached to the second tube end. The cable may enclose a part of the first conductor and/or the second conductor.

The microphone assembly may comprise a connector with first and second terminals. The connector may be attached to the second tube end. An electrical cable comprising a corresponding connector may be connectable to the connector of the microphone assembly. The first terminal may be connected to the first conductor. The second terminal may be connected to the second conductor.

The tube may comprise one or more tube clamping sections, e.g. the first tube part and/or the second tube part may comprise the tube clamping section.

A clamping section facilitates clamping of the microphone assembly to a piece of clothing placed between two clamping sections, e.g. between a first clamping section and a second clamping section of the tube and/or between a clamping section of the tube and a clamping section of a clamp member.

A clamping section of the rigid tube, e.g. a first clamping section and/or a second clamping section, may be covered or at least partly covered with a material, e.g. silicone or other rubber material, for providing increased friction compared to the tube material.

The microphone assembly may comprise a clamp member mounted on the tube. The tube may comprise a tube clamping section. The clamp member may be configured for clamping the microphone assembly to a piece of clothing placed between the tube clamping section and a clamping section of the clamp member.

The clamping section of the clamp member is at least the part of the clamp member that provides a clamping pressure towards the tube clamping section. Thus, the tube clamping section is located oppositely the clamping section of the clamp member.

The clamp member may comprise a resilient member. The resilient member may preferably be a leaf spring. The clamp member may comprise one or more support elements, e.g. a first support element or a first support element and a second support element. A support element may connect the resilient member to the tube.

The purpose of the clamp member may be to affix the microphone assembly to a piece of clothing. The piece of clothing may be placed between the clamping sections, i.e. the tube clamping section and the clamping section of the clamp member. Thus, the clamp member and the tube may in combination provide a pressure on the piece of clothing. Thereby, friction between the piece of clothing and the tube and/or clamp member affix the microphone assembly to the piece of clothing. Providing the clamp member with a resilient member, such as a leaf spring, may provide an ability to affix the microphone assembly to clothing of different thicknesses, e.g. a thin shirt or a thick jacket.

At least a part of the clamp member may be covered with a material, e.g. silicone or other rubber material, for providing increased friction compared to the clamp member material. Alternatively or additionally, at least a part of the tube, or the tube clamping section, or at least a part of the tube clamping section, may be covered with a material, such as silicone or other rubber material, for providing increased friction compared to the tube material.

The microphone assembly may comprise a distance from the second tube end to a plane perpendicular to the tube in the clamping section. The distance may be less than 5 mm.

Small accidental jerks of a cable connected to the second tube end may produce a pulling force on the microphone assembly. By limiting the distance between the clamping section and the second tube end, the pulling force is not providing a torque or at least the torque is limited, thus the microphone assembly does not rotate due to accidental jerks of the connected cable.

The first and/or second rotating connector, may have a rotation resistance larger than a first threshold value and/or a second threshold value, respectively. The rotation resistance of a rotating connector is defined as the torque required to initiate or perform rotation of the first tube part and the second tube part in relation to each other. Accordingly the rotation resistance of the second rotating connector is defined as the moment or torque required to initiate or perform rotation of the second tube part and the third tube part in relation to each other. The first threshold value and/or the second threshold value may be larger than 1 mNm.

A rotating connector, e.g. the first and/or the second rotating connector, may have a plurality of different coupling states, including a first coupling state and a second coupling state. In different coupling states, first connector part (e.g. connected to first tube part or second tube part) and second connector part (e.g. connected to second tube part or third tube part) are rotated in relation to another around a rotational axis. The first and/or second rotating connectors may provide unlimited rotation around a single rotational axis. Alternatively, the first and/or second rotating connector may provide limits to rotation, such that the first and/or second rotating connector may have a range of motion of less than 360 degrees, e.g. less than 200 degrees, e.g. 180 degrees.

The first and/or second rotating connector may provide a plurality of predefined angular positions, such as two, three or more predefined angular positions. The predefined angular positions may be angular positions where the rotation resistance of the first and/or second rotating connector is larger than the rotation resistance in intermediate angular positions, i.e. angular positions that is not a predefined angular position.

The first and/or second rotating connector may comprise a first predefined angular position and a second predefined angular position. The first predefined angular position and the second predefined angular position may be between 45-190 degrees apart. Thus, the microphone assembly can be turned upside down, e.g. if being fitted to a man's or a woman's shirt. The plurality of predefined angular positions may comprise a third angular position, wherein the first, second and third angular positions are between 80-100 degrees apart. Thus, the microphone assembly may be able to be turned upside down as already described, and the microphone assembly may provide for easier packaging.

The microphone may be a directional microphone. With the disclosed microphone assembly, the microphone may be orientated to have a direction towards the mouth of the user. Especially when the microphone is a directional microphone, directing the microphone towards the mouth of a user is an advantage.

The tube parts, e.g. the first tube part and/or the second tube part and/or the third tube part, may be rigid, or stiff, in the sense resembling a typical metal, hence, the physical form of the rigid tube is maintained if the microphone assembly is used as preferred, i.e. during preferred use plastic deformation will be none or at least limited, and yield strength and proportionality limit are largely equal.

The tube parts may be made of a material having an elastic modulus, such as an elastic modulus of more than 50 GPa. The tube parts may be made of a material having an elastic modulus larger than a first threshold value of 100 GPa. The tube parts may be made of stainless steel.

The tube parts may have diameters of less than 5 mm, such as less than 3 mm. such as less than 2 mm. The tube diameter may be larger than 0.5 mm to provide a sufficiently rigid tube.

The tube parts may be made of an electrically conductive material, such as a metal or an alloy comprising one or more metals. The tube parts may be made of a composite material, e.g. comprising one or more polymers. The composite material may comprise a metal. The tube parts may form a channel accommodating at least a part of the first conductor. An insulator may insulate the first conductor from the tube parts.

Figure 1:
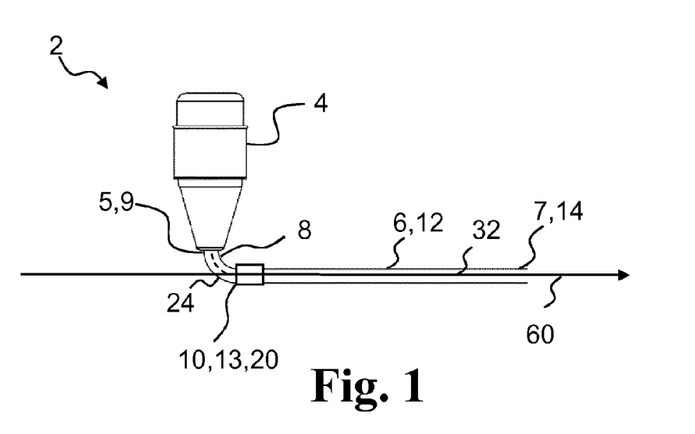
FIG. 1 schematically illustrates an exemplary microphone assembly.

FIG. 1 schematically illustrates an exemplary microphone assembly 2. The microphone assembly 2 comprises a microphone 4 and a tube 6. The tube 6 has a first tube end 5 and a second tube end 7, and the tube 6 at least partly encloses a first conductor 32. The microphone 4 is attached at the first tube end 5, and the first conductor 32 is configured for conducting a microphone signal from the microphone 4 to the second tube end. Further, the tube 6 comprises a rigid first tube part 8 with a first primary end 9 and a first secondary end 10, a rigid second tube part 12 with a second primary end 13 and a second secondary end 14, and a first rotating connector 20 between the first tube part 8 and the second tube part 12.

The microphone 4 is attached at the first primary end 9, and the first rotating connector 20 connects the first secondary end 10 and the second primary end 13. In the exemplary microphone assembly 2 as illustrated in FIG. 1, the first rotating connector 20 allows rotation of the first tube part 8 in respect to the second tube part 12 about a first rotation axis 60 being a longitudinal center axis of the second tube part 12. The first tube part 8 comprises a first primary bend 24 which in combination with the first rotating connector 20 allow the direction of the microphone 4 to be changed in relation to the second tube part 12.

A connector (not shown) may connect an electrical cable to the second tube end 7 for connecting the microphone assembly to an auxiliary device (not shown).

Figure 2:
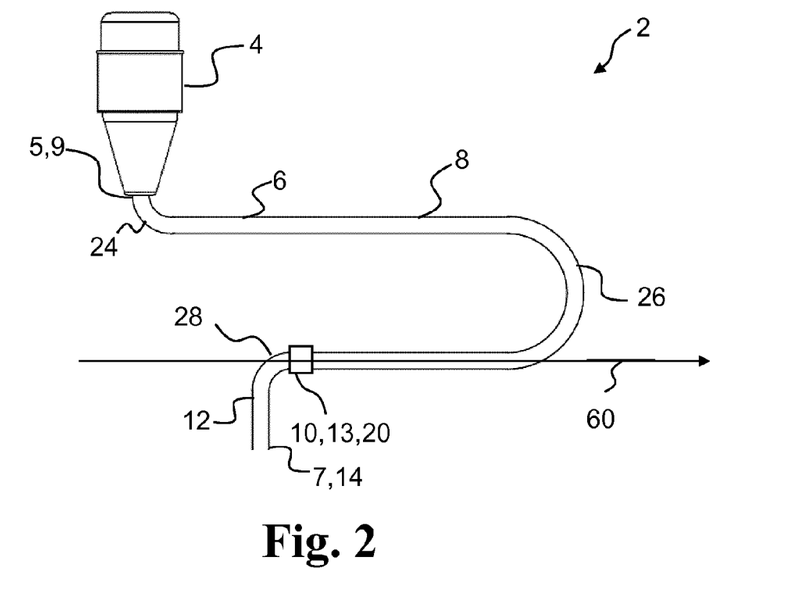
FIG. 2 schematically illustrates an exemplary microphone assembly.

FIG. 2 schematically illustrates an exemplary microphone assembly 2 comprising a microphone 4 and a tube 6. The tube 6 comprises a rigid first tube part 8, a rigid second tube part 12, and a first rotating connector 20 between the first tube part 8 and the second tube part 12. The first tube part 8 comprises a first primary end 9 and a first secondary end 10, and the first tube part 8 comprises a first primary bend 24 (L-shaped) and a first secondary bend 26 (U-shaped). The second tube part 12 comprises a second primary end 13 and a second secondary end 14.

The first rotating connector 20 connects the first secondary end 10 and the second primary end 13. In the exemplary microphone assembly 2 as illustrated in FIG. 1, the first rotating connector 20 allows rotation of the first tube part 8 in respect to the second tube part 12 around a first rotation axis 60 along a longitudinal center axis of the first tube part 8 at the first secondary end. In the FIG. 2 illustrated exemplary microphone assembly 2, the second tube part 12 comprises a second primary bend 28 which in combination with the first rotating connector 20 allows the direction of the second tube end 7 to be changed in relation to the second tube part 12. Thus, the first rotating connector 20 allows directing a connected cable (not shown) in a desirable direction, i.e. down if an auxiliary device is placed on the waist of a user.

Figure 3:
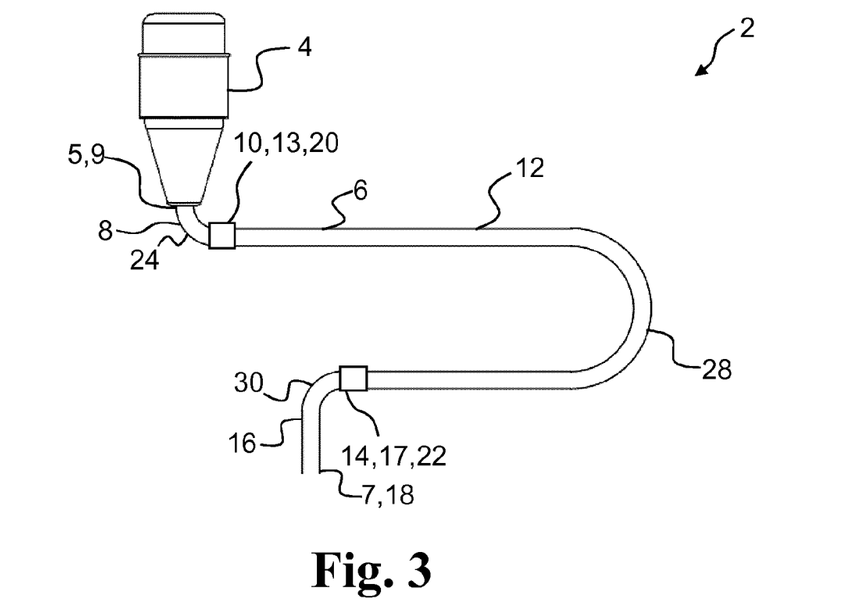
FIG. 3 schematically illustrates an exemplary microphone assembly.

FIG. 3 schematically illustrates an exemplary microphone assembly 2 comprising a microphone 4 and a tube 6. The tube 6 comprises a rigid first tube part 8, a rigid second tube part 12, and a rigid third tube part 16. The tube 6 further comprises a first rotating connector 20 between the first tube part 8 and the second tube part 12, and the tube 6 comprises a second rotating connector 22 between the second tube part 12 and the third tube part 16.

The first rotating connector 20 connects a first secondary end 10 of the first tube part 8 and a second primary end 13 of the second tube part 12. The second rotating connector 22 connects a second secondary end 14 of the second tube part 12 and a third primary end 17 of the third tube part 16. The third tube part 16 further comprises a third secondary end 18 which forms the second tube end 7 of the tube 6.

The first tube part 8 comprises a first primary bend 24, the second tube part 12 comprises a second primary bend 28, and the third tube part 16 comprises a third primary bend 30.

The combination of the first rotating connector 20 and the first primary bend 24 allow changing the direction of the microphone 4 in relation to the second tube part 12. Thus, the microphone 4 can be directed towards the mouth of a user. The combination of the second rotating connector 22 and the third primary bend 30 allow changing the direction of a cable (not shown) attached to the second tube end 7. Thus, the attached cable can be directed towards an auxiliary device.

Figure 4:
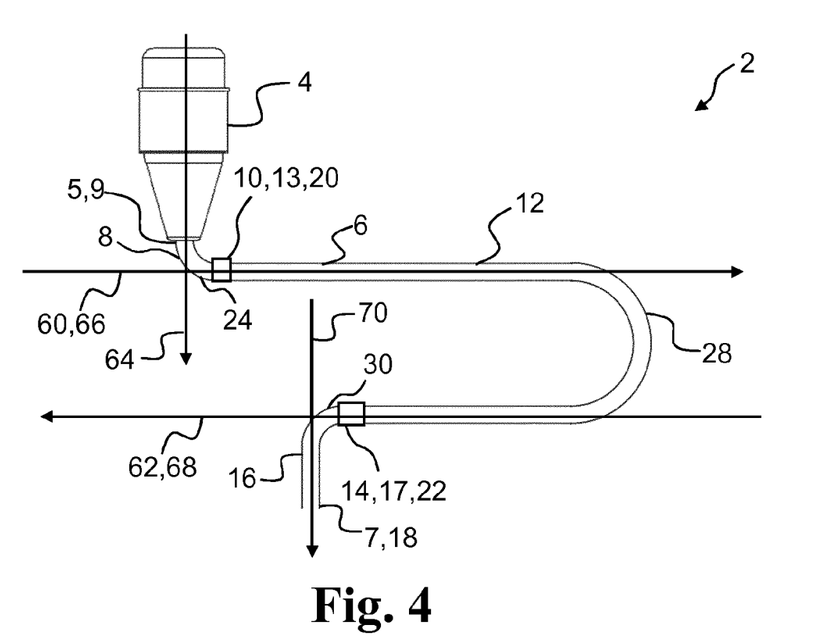
FIG. 4 schematically illustrates an exemplary microphone assembly.

FIG. 4 schematically illustrates an exemplary microphone assembly 2 comprising the same features as described in relation to FIG. 3. The microphone assembly 2 in FIG. 4 is shown with marked axes.

The first rotating connector 20 between the first tube part 8 and the second tube part 12 allows rotation of the first tube part 8 in relation to the second tube part 12 about a first rotation axis 60. The first rotation axis 60 extends along a longitudinal center axis of the first secondary tube end 10, and along a longitudinal center axis of the second primary tube end 13. In an alternative exemplary microphone assembly, the first rotation axis 60 may be different from one or both of the longitudinal center axis of the first secondary tube end 10 and the longitudinal center axis of the second primary tube end 13.

The second rotating connector 22 between the second tube part 12 and the third tube part 16 allows rotation of the third tube part 16 in relation to the second tube part 12 about a second rotation axis 62. The second rotation axis 62 extends along a longitudinal center axis of the second secondary tube end 14, and along a longitudinal center axis of the third primary tube end 17. In an alternative exemplary microphone assembly, the second rotation axis 62 may be different from one or both of the longitudinal center axis of the second secondary tube end 14 and the longitudinal center axis of the third primary tube end 17.

Also shown in FIG. 4 is a selection of longitudinal center axes 64, 66, 68, 70 of the tube 6, which illustrates the magnitude of bends 24, 28, 30.

The first bend 24 bends the first tube part 8 from a longitudinal direction depicted by a first longitudinal axis 64 corresponding to a longitudinal center axis of the first primary tube end 9, to a direction depicted by a second longitudinal axis 66 corresponding to a longitudinal center axis of the first secondary tube end 10. In the illustrated example, the change in direction of the first longitudinal axis 64 and the second longitudinal axis 66 is 90 degrees.

The second primary bend 28 bends the second tube part 12 from a longitudinal direction depicted by the second longitudinal axis 66 corresponding to a longitudinal center axis of the second primary tube end 13, to a direction depicted by a third longitudinal axis 68 corresponding to a longitudinal center axis of the second secondary tube end 14. In the illustrated example, the change in direction of the second longitudinal axis 66 and the third longitudinal axis 68 is 180 degrees.

The third primary bend 30 bends the third tube part 16 from a longitudinal direction depicted by the third longitudinal axis 68 corresponding to a longitudinal center axis of the third primary tube end 17, to a direction depicted by a fourth longitudinal axis 70 corresponding to a longitudinal center axis of the third secondary tube end 18. In the illustrated example, the change in direction of the third longitudinal axis 68 and the fourth longitudinal axis 70 is 90 degrees.

Figure 5:
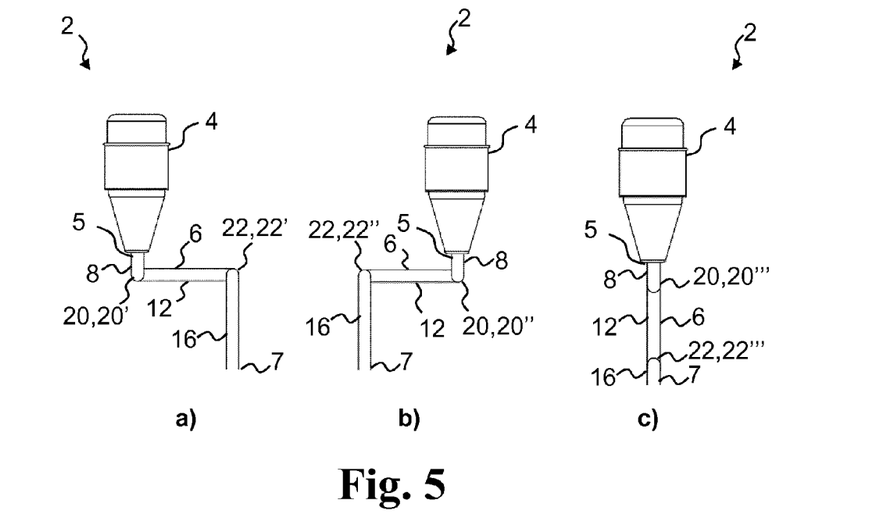

FIGS. 5a, 5b, and 5c, schematically illustrates an exemplary microphone assembly 2 with rotating connectors 20, 22 in different angular positions 20', 20'', 20''', 22', 22'', 22'''. FIGS. 5a, 5b and 5c are seen from the left side in relation to FIGS. 2-4.

FIG. 5a illustrates the microphone assembly 2, wherein the first rotating connector 20 is in a first angular position 20', wherein the microphone 4 is pointing towards a user's mouth while the microphone assembly is attached to an opening of a man's shirt. The second rotating connector 22 is in a first angular position 22', wherein the second end 7 is pointing downwards, or opposite the direction of the microphone 4, to direct a connected cable (not shown) towards an auxiliary device (not shown), which may be attached to the waistline of the user.

FIG. 5b illustrates the microphone assembly 2, wherein the first rotating connector 20 is in a second angular position 20'', wherein the microphone 4 is pointing towards a user's mouth while the microphone assembly is attached to an opening of a woman's shirt. The second rotating connector 22 is in a secon angular position 22'', wherein the second end 7 is pointing downwards, or opposite the direction of the microphone 4, to direct a connected cable (not shown) towards an auxiliary device (not shown), which may be attached to the waistline of the user.

FIG. 5c illustrates the microphone assembly 2, wherein the first rotating connector 20 is in a third angular position 20''', wherein the tube parts 8, 12, 16 are aligned to e.g. allow easier and/or a more protected storing position.

For the first rotating connector 20 and/or the second rotating connector 22, range of motion from the first angular positions 20', 22' to the second angular positions 20'', 22'' may, as illustrated, be 180 degrees. The third angular position 20''', 22''', for the first rotating connector 20 and/or the second rotating connector 22, may be an intermediate position between the first angular positions 20', 22' and the second angular positions 20'', 22''. The range of motion form the first angular positions 20', 22' to the third angular positions 20''', 22''' may as illustrated be 90 degrees. The range of motion form the second angular positions 20'', 22'' to the third angular positions 20''', 22''' may as illustrated be 90 degrees.

Figure 6:
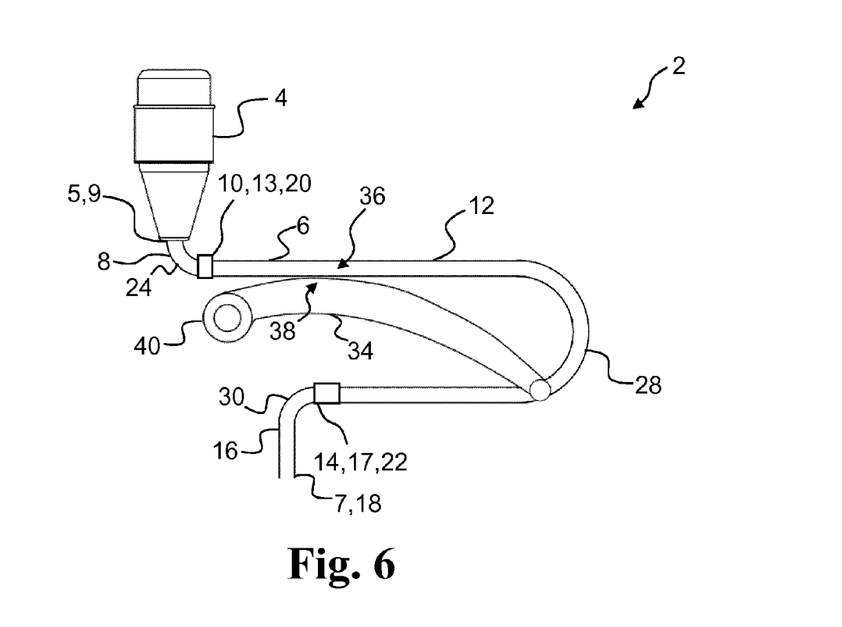

FIG. 6 schematically illustrates an exemplary microphone assembly 2 comprising a microphone 4 and a tube 6. The microphone assembly 2 further comprises a clamp member 34. The clamp member 34 is attached to the tube 6. In the illustrated example the clamp member 34 is attached to the second tube part 8.

The clamp member 34 is a resilient body adapted to provide a pressure against the tube 6, e.g. the clamp member may comprise a resilient member such as a leaf spring. The pressure between the tube 6 and the clamp member 34 is provided in the tube clamping section 36 and the clamping section 38 of the clamp member 34. The clamp member 34 has a rounded end 40 such that a piece of clothing can be positioned between the tube clamping section 36 and the clamping section 38 of the clamp member 34, or be removed, without harm to the clothes.

The clamping of the microphone assembly 2 to a piece of clothing, rely on obtaining a frictional force between any of the clamping sections 36, 38 and the piece of clothing, wherein the frictional force is of a sufficient magnitude to maintain the microphone assembly 2 in the desired location. In order to increase the frictional force, the tube clamping section 36 and/or the clamping section 38 of the clamp member 34 may be covered by a material, e.g. silicone or other rubber material, increasing the friction comparing to the material of the rigid tube 6 and/or the clamp member 34, respectively.

The exemplary microphone assembly 2 of FIG. 6 is shown comprising a first rotating connector 20 and a second rotating connector 22. However, the rotating connectors 20, 22 are not essential for the clamp member 34, hence, a clamp member 34 may be provided in combination with a microphone assembly 2 as illustrated in any of the previous examples.

Figure 7:
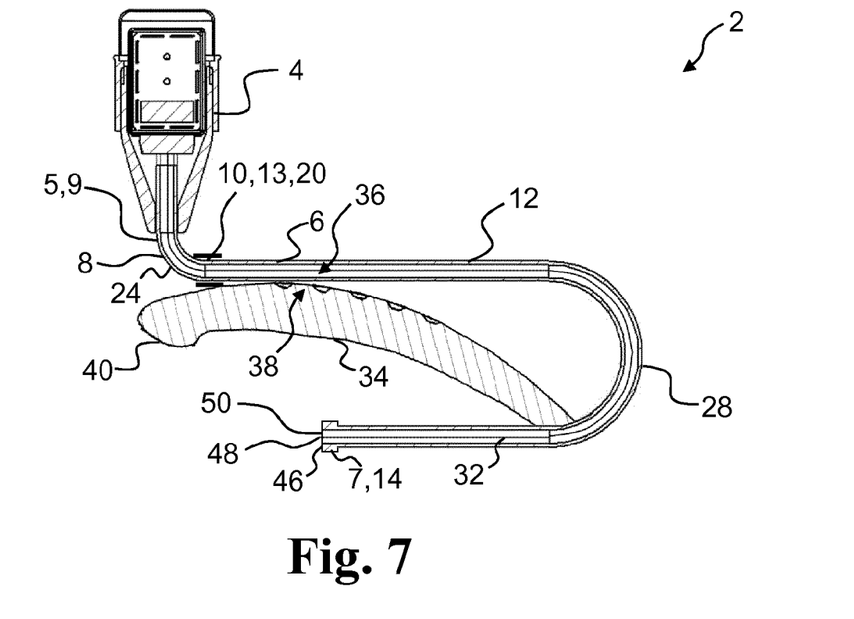

FIG. 7 schematically illustrates a cross section of an exemplary microphone assembly 2. It is seen, that attachment of the microphone 4 on the first tube end 5 may involve a part of the tube 6 to extend into a housing of the microphone 4. The microphone 4 is adapted to convert an acoustic signal to an electrical microphone signal. The microphone signal is fed through the first conductor 32 which extends from the microphone 4 and through the tube 6. The microphone assembly 2 comprises a connector 46 at the second tube end 7. The connector 46 comprises a first terminal 48 and a second terminal 50. In FIG. 7 the connector 46 is depicted as a coax connector, wherein the first terminal 48 is connected to the first conductor 32, and the second terminal 50 is connected to the wall of the tube 6. In this example, the tube 6 is made from a conducting material such as a metal. Alternatively a second conductor (not shown) may extend from the microphone 4 and through the tube 6 and connect to the second terminal 50.

Figure 8:
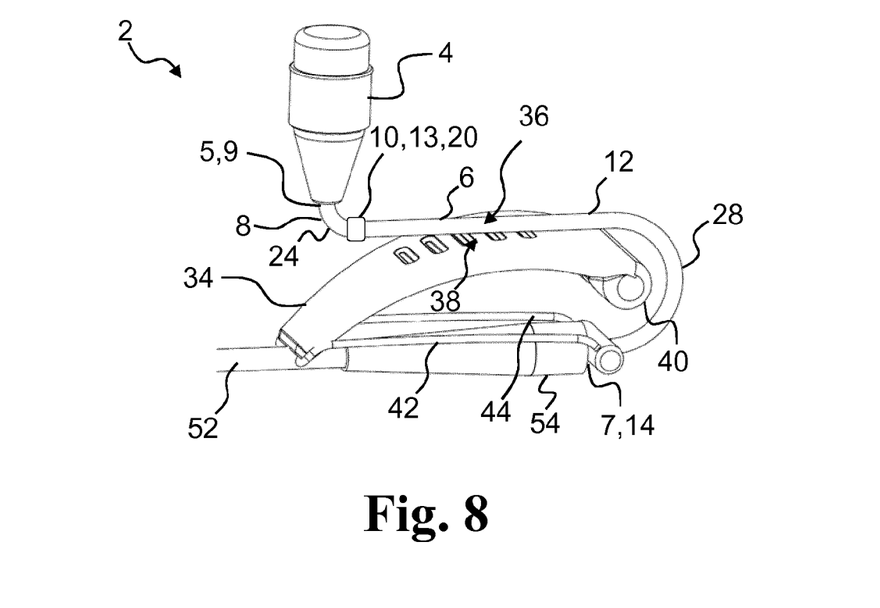

FIG. 8 schematically illustrates an exemplary microphone assembly 2 comprising a microphone 4, a tube 6, and a clamp member 34. The tube 6 comprises a first rotating connector 20 connecting a rigid first tube part 8 with a rigid second tube part 12, wherein the first tube part 8 comprises a first primary bend 24 and the second tube part 12 comprises a second primary bend 28.

The clamp member 34 comprises a first support element 42 and a second support element 44. The first 42 and second 44 support elements attaches the clamp member 34 to the second tube end 7 of the tube 6. FIG. 8 further illustrates the microphone assembly with a cable 52 attached with a cable connector 54 to the second tube end 7.

In the microphone assemblies of FIGS. 3, 4, 6 and 7, the second rotating connector 22 may be omitted and the third tube part may constitute a part of the second tube part, thus forming a second tube part comprising a second primary bend and a second secondary bend.

Figure 9:
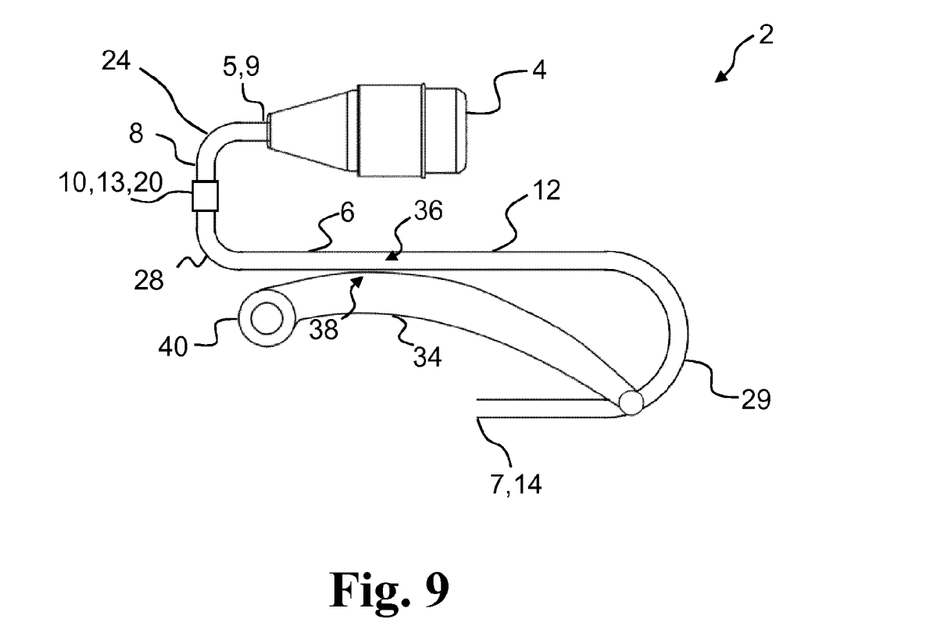
FIG. 9 schematically illustrates an exemplary microphone assembly.

FIG. 9 schematically illustrates an exemplary microphone assembly 2 comprising a microphone 4 and a tube 6. The tube 6 comprises a rigid first tube part 8 and a rigid second tube part 12. The first tube part 8 and the second tube part 12 are connected by a first rotating connector 20. The first rotating connector 20 between the first tube part 8 and the second tube part 12 allows rotation of the first tube part 8 in relation to the second tube part 12.

The first tube part 8 comprises a first primary bend 24, and the second tube part 12 comprises a second primary bend 28 and a second secondary bend 29. The first primary bend 24 is an L-shaped bend. The second primary bend is an L-shaped bend, and the second secondary bend is a U-shaped bend.

The combination of the first primary bend 24, the second primary bend 28 and the first rotating connector 20 allows the microphone 4 to be directed in a desired direction, e.g. towards a specific sound source. This direction of the microphone 4 can, due to the first rotating connector 20, be changed without changing how the microphone assembly 2 is mounted to a piece of clothing.

The microphone assembly 2 of FIG. 9 is further illustrated comprising a clamp member 34 attached to the second tube part 8.

Figure 10:
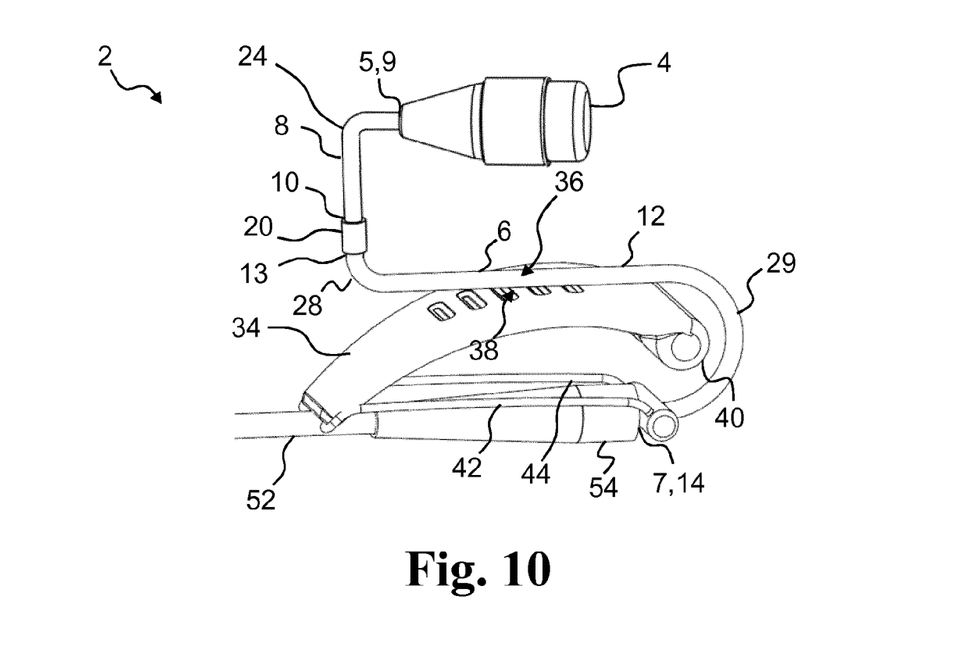
FIG. 10 schematically illustrates an exemplary microphone assembly.

FIG. 10 schematically illustrates an exemplary microphone assembly 2 comprising a microphone 4, a tube 6, and a clamp member 34. The tube 6 comprises a first rotating connector 20 connecting a rigid first tube part 8 with a rigid second tube part 12, wherein the first tube part 8 comprises a first primary bend 24 and the second tube part 12 comprises a second primary bend 28 and a second secondary bend 29.

The clamp member 34 comprises a first support element 42 and a second support element 44. The first 42 and second 44 support elements attaches the clamp member 34 to the second tube end 7 of the tube 6. FIG. 10 further illustrates the microphone assembly with a cable 52 attached with a cable connector 54 to the second tube end 7.

LIST OF REFERENCES 2 microphone assembly
4 microphone
5 first tube end
6 tube
7 second tube end
8 first tube part
9 first primary tube end
10 first secondary tube end
12 second tube part
13 second primary tube end
14 second secondary tube end
16 third tube part
17 third primary tube end
18 third secondary tube end
20 first rotating connector
20' first angular position of first rotating connector
20" second angular position of first rotating connector
20'" third angular position of first rotating connector
22 second rotating connector
22' first angular position of second rotating connector
22" second angular position of second rotating connector
22'" third angular position of second rotating connector
24 first primary bend
26 first secondary bend
28 second primary bend
29 second secondary bend
30 third primary bend
31 third secondary bend
32 first conductor
34 clamp member
36 tube clamping section
38 clamping section of clamp member
40 rounded end of clamp member
42 first support element
44 second support element
46 connector
48 first terminal
50 second terminal
52 cable
54 cable connector
60 first rotation axis
62 second rotation axis
64 first longitudinal center axis
66 second longitudinal center axis
68 third longitudinal center axis
70 fourth longitudinal center axis

The invention claimed is:

1. A microphone assembly comprising:
   a microphone, which converts an acoustic signal to an electrical microphone signal;
   a tube enclosing at least a part of a first conductor, which conducts the microphone signal, the tube comprising a rigid first tube part, and a rigid second tube part;
   a clamp member mounted on the tube, which affixes the microphone assembly to a piece of clothing;
   the first tube part comprising a first primary bend and having a first primary tube end and a first secondary tube end, and wherein the microphone is attached at the first primary tube end;
   the second tube part having a second primary tube end and a second secodary tube end; and
   a first rotating connector between the first tube part and the second tube part, which rotates the first tube part in relation to the second tube part about a first rotation axis, wherein the first rotation axis is a longitudinal center axis of the first tube part at the first secondary tube end.

2. The microphone assembly according to claim 1, wherein the first tube part comprises a first secondary bend.

3. The microphone assembly according to claim 1, wherein the second tube part comprises a second primary bend.

4. The microphone assembly according to claim 1, wherein the first rotating connector is releasable allowing separation of the first tube part and the second tube part.

5. The microphone assembly according to claim 1, wherein the microphone assembly comprises a rigid third tube part with a third primary tube end and a third secondary tube end, and wherein the microphone assembly comprises a second rotating connector between the second tube part and the third tube part, which rotates the second tube part in relation to the third tube part about a second rotation axis.

6. The microphone assembly according to claim 5, wherein the second rotation axis is a longitudinal center axis of the second tube part at the second secondary tube end.

7. The microphone assembly according to claim 5, wherein the second rotating connector is releasable allowing separation of the second tube part and the third tube part.

8. The microphone assembly according to claim 5, wherein the third tube part comprises a third primary bend.

9. The microphone assembly according to claim 1, wherein the microphone assembly comprises a connector with first and second terminals attached to the second secondary tube end.

10. The microphone assembly according to claim 5, wherein the microphone assembly comprises a connector with first and second terminals attached to the third secondary tube end.

11. The microphone assembly according to claim 1, wherein the tube comprises a tube clamping section, and wherein the clamp member is configured for clamping the microphone assembly to a piece of clothing placed between the tube clamping section and a clamping section of the clamp member.

12. The microphone assembly according to claim 1, wherein the clamp member comprises a resilient member.

13. The microphone assembly according to claim 1, wherein the clamp member comprises one or more support elements.

14. The microphone assembly according to claim 11, wherein the second tube part comprises the tube clamping section.

15. The microphone assembly according to claim 1, wherein at least a part of the clamp member is covered with a material that provides a greater friction than the clamp member material.

* * * * *